United States Patent
Kikuyama et al.

(10) Patent No.: US 6,896,866 B2
(45) Date of Patent: May 24, 2005

(54) METHOD FOR PURIFICATION OF TUNGSTEN HEXAFLUORIDE

(75) Inventors: Hirohisa Kikuyama, Osaka (JP); Masahide Waki, Osaka (JP); Kazuyuki Fujimoto, Osaka (JP); Yoshinori Nakagawa, Osaka (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 0 days.

(21) Appl. No.: 10/149,881

(22) PCT Filed: Dec. 14, 2000

(86) PCT No.: PCT/JP00/08849

§ 371 (c)(1),
(2), (4) Date: Sep. 25, 2002

(87) PCT Pub. No.: WO01/44112

PCT Pub. Date: Jun. 21, 2001

(65) Prior Publication Data

US 2003/0091498 A1 May 15, 2003

(30) Foreign Application Priority Data

Dec. 16, 1999 (JP) .......................................... 11-358205

(51) Int. Cl.$^7$ ............................................. C01G 41/04
(52) U.S. Cl. .................... 423/489; 423/492; 423/240 S
(58) Field of Search ................................... 423/489, 492, 423/240 S, 53, 59

(56) References Cited

U.S. PATENT DOCUMENTS

| 5,234,679 A | * | 8/1993 | Suenaga et al. | ............ 423/489 |
| 5,324,498 A | * | 6/1994 | Streusand et al. | .......... 423/489 |
| 6,103,212 A | * | 8/2000 | Salim et al. | ................. 423/489 |

FOREIGN PATENT DOCUMENTS

| JP | 02124723 A | 5/1990 |
| JP | 04342423 A | 11/1992 |
| JP | 11180716 A | 7/1999 |

* cited by examiner

Primary Examiner—Ngoc-Yen Nguyen
(74) Attorney, Agent, or Firm—Randall J. Knuth

(57) ABSTRACT

A method for purifying tungsten hexafluoride of high purity, capable of producing tungsten hexafluoride of higher purity than that of the related art, readily and at a low cost. A method for purifying tungsten hexafluoride of high purity, characterized in that tungsten hexafluoride containing molybdenum hexafluoride as an impurity, makes contact with a layer, in which a metal or an alloy is packed, containing at least one of molybdenum, tungsten, copper, nickel, iron, cobalt, zinc, titanium, aluminum, calcium, and magnesium at a temperature ranging from 0° C. to 100° C.

10 Claims, 2 Drawing Sheets

(a)

(b)

(a)

(b)

METHOD FOR PURIFICATION OF TUNGSTEN HEXAFLUORIDE

BACKGROUND OF THE INVENTION

1. Field of the Invention

The present invention relates to a method for purifying tungsten hexafluoride of high purity, and more specifically relates to a method for purifying tungsten hexafluoride to high purity and removing molybdenum hexafluoride, which contaminates tungsten hexafluoride, both cheaply and efficiently.

2. Description of the Related Art

Known methods used for purifying tungsten hexafluoride are reactions of chlorides of tungsten with fluorides such as HF and $AsF_3$ and reactions of metal tungsten with fluorine.

If it is assumed that impurities, other than molybdenum, which have contaminated tungsten hexafluoride produced by these methods are those of chlorides and fluorides, these impurities can be readily separated and removed from tungsten hexafluoride by using a difference in boiling point and vapor pressure of tungsten hexafluoride from those impurities. However, molybdenum has similar properties to those of tungsten because molybdenum is a congener of tungsten and is therefore difficult to separate and remove by distillation.

As the method for removing molybdenum from tungsten, a method is described where a metal piece makes contact with tungsten hexafluoride at a temperature between 100° C. and 500° C. (Japanese Patent No. 2848717). Using this method, it is necessary for all of the tungsten hexafluoride to be converted to tungsten trifluoride and a distillation tower for purification therefore has to keep the temperature in a range from 100° C. to 500° C. This method is therefore neither suitable nor effective when operating costs are taken into consideration.

Moreover, the above described technology carries out heating to a high temperature ranging from 100° C. to 500° C. to cause decomposition of $WF_6$ by installation of a packed tower made of SUS (stainless steel.)

The present invention provides a method for purifying tungsten hexafluoride of high purity, wherein production of tungsten hexafluoride of higher purity than in the related art is possible in a straightforward manner and at a low cost.

SUMMARY OF THE INVENTION

Taking into consideration the issues described above, the present inventors subjected tungsten hexafluoride (the material to be subject to purification) is provided containing molybdenum hexafluoride as an impurity to solid-gas reaction and/or solid-liquid reaction and solid-liquid contact under specific conditions resulting in the present invention and found a method capable of readily, effectively, and economically purifying tungsten hexafluoride to high purity.

The present invention provides a method for purifying tungsten hexafluoride to a high purity, characterized in that tungsten hexafluoride, which is the material to be purified, containing at least molybdenum hexafluoride as an impurity, makes contact with a metal or alloy containing at least one of molybdenum, tungsten, copper, nickel, iron, cobalt, zinc, titanium, aluminum, calcium, and magnesium at a temperature ranging from 0° C. to 100° C.

In the present invention, the temperature at which molybdenum hexafluoride makes contact with the metal or alloy is set to from 0° C. to 100° C.

At 100° C. or higher, the rate at which impurities are removed deteriorates. On the other hand, at temperatures lower than 0° C., tungsten solidifies which may cause clogging.

Within a range from 0° C. to 100° C., 20° C. to 90° C. is therefore preferable, and 40° C. to 70° C. is more preferable.

Generally, a metal or an alloy is packed inside a packed tower having an introducing orifice and a discharging orifice and supplies the material to be purified from the introducing orifice in a gaseous or liquid state.

The temperature of the material to be purified introduced into the packed tower preferably ranges from 30° C. to 80° C. Creating such temperature makes controlling of the temperature within the packed tower straightforward to enable a stable purification reaction. In addition, the influence of the material to be purified on a main portion of the packed tower can be reduced.

The period of time for which the material to be purified is in contact with the metal depends on the surface area of the metal used and the rate of flow of the introduced gas is preferably 5 to 10 minutes.

The setting of this range ensures that both reactivity and the amount processed per unit time are both desirable from an economic point of view.

The material to be purified is generally introduced into the packed tower in a gaseous state, but may also be in a liquid state.

In the case where the material to be purified makes contact with the metal in a gaseous state, as shown in FIG. 1(a), it is preferable that the material to be purified is introduced from the bottom of the packed tower and discharged from the top of the packed tower. On the other hand, when the material to be purified makes contact with the metal in a state where there is a mixture of both gas and liquid, as shown in FIG. 1(b), it is preferable that the material to be purified is introduced from the top of the packed tower and discharged from the bottom of the packed tower.

For packing the metal in the packed tower, it is preferable, as shown in FIG. 2, that the metal 3 is packed in the packed tower 1 to form a space 2 horizontally, which is used as a path for the material 4 to be purified. In a vertical-type packed tower shown in FIGS. 1a and 1b, the metal resists the passing of the material to be purified and introduction of the necessary amount of material to be purified (flow rate) requires a higher pressure for supplying the material to be purified. As shown in FIG. 2, if the path (space 2) for the material 4 to be purified is made in advance at the packed tower, a necessary flow can be regulated using low pressure.

Melting points and a boiling points of individual components are as shown below.

$WF_6$
Melting point 2° C.; boiling point 17° C.
$MoF_6$
Melting point 17° C.; boiling point 32° C.
$MoF_5$
Melting point 67° C.; boiling point 214° C.
$MoF_3$
Sublimation point 800° C.

In the present invention, if the temperature at which contact is made is set to the boiling point or lower of the material to be purified, introducing the material to be purified in a gaseous state allows the material to be purified to become a mixture of gas and liquid, and molybdenum hexafluoride, which has contaminated the tungsten hexafluoride, is reduced by the solid-gas reaction and the solid-liquid reaction to yield stable molybdenum pentafluoride and molybdenum trifluoride.

If the contact temperature is set to the boiling point or lower of the material to be purified, introducing the material to be purified in a liquid state allows the material to be purified to become a liquid, and molybdenum hexafluoride, which is contaminated with tungsten hexafluoride, is reduced by the solid-liquid reaction to yield stable molybdenum pentafluoride and molybdenum trifluoride.

On the other hand, if the contact temperature is set to the boiling point or higher of the material to be purified, introducing the material to be purified in the gas state allows the material to be purified to become a gas and molybdenum hexafluoride, which has contaminated tungsten hexafluoride, is reduced by the solid-gas reaction to yield solid stable molybdenum pentafluoride and molybdenum trifluoride.

If the contact temperature is set to the boiling point or higher of the material to be purified, introducing the material to be purified in the liquid state allows the material to be purified to become a mixture of gas and liquid and molybdenum hexafluoride, which has contaminated the tungsten hexafluoride, is reduced by the solid-gas reaction and solid-liquid reaction to yield stable molybdenum pentafluoride and molybdenum trifluoride.

Molybdenum, tungsten, copper, nickel, iron, cobalt, zinc, titanium, aluminum, calcium, and magnesium react selectively with molybdenum hexafluoride, but molybdenum hexafluoride does not react under the above described conditions.

As described above, in the present invention, it was found that tungsten hexafluoride can be purified to a high degree at a temperature of 100° C. or lower, which, conventionally, does not permit the yielding of tungsten hexafluoride of a high purity.

According to the present invention, molybdenum hexafluoride produces molybdenum pentafluoride and molybdenum trifluoride due to a solid-gas reaction and/or solid-liquid reaction with molybdenum. However, within such a temperature range, molybdenum pentafluoride and molybdenum trifluoride exhibit a stable state and a low vapor pressure to allow molybdenum to be deposited on a packed layer resulting in collection.

Molybdenum hexafluoride exhibits the same reaction with tungsten, copper, nickel, iron, cobalt, zinc, titanium, aluminum, calcium, and magnesium to produce molybdenum pentafluoride and molybdenum trifluoride. Fluorides of these metals are also produced simultaneously. All these metals except tungsten exhibit stable solid states and can be collected from the layer in which the metal is packed. Tungsten is not problematic because it becomes tungsten fluoride.

According to the present invention, solid-liquid contact of the material in the liquid state for purification with the metal allows easy separation and collection of fluorides of molybdenum exhibiting a solid state at such temperatures.

According to the present invention, the metal used for removal of molybdenum hexafluoride contaminating tungsten hexafluoride is not restricted in quality, but used generally in a linear, swarf, and particle state. Powder and particulate states are preferable in order that contact of the gas taken as the material to be purified and a liquefied material to be purified with the metal is improved.

Excessive particle size causes reactivity to be poor and a particle size of 1 mm or smaller is therefore preferred. If particle size exceeds 1 mm, spaces occur between granular metals that allow fluid constituting the material to be purified to flow easily. If the fluid does not flow in a turbulent manner, the fluid will always flow through the same path and will therefore always react with the same metal, which means that the reaction is not performed in a sufficient manner.

A lower limit of the particle size is preferably 1 $\mu$m. If the particle size is smaller than 1 mm, surface area becomes excessively large and causes an increase in an amount of an oxide film formed on the surface which inhibits the reaction.

Particle distribution is not restricted. Because molybdenum pentafluoride and molybdenum trifluoride produced by the reduction reaction of molybdenum hexafluoride with the metal (or alloy) covers the metal (or alloy), the surface area of the metal used is preferably large. The larger the surface area of the metal (or alloy) the more molybdenum hexafluoride is collected. The particles of metal used for the packed tower are therefore preferably small in size.

According to the present invention, materials used for the packed tower and a collector are, for example, stainless steel, nickel, and copper. The packed tower is preferably cylindrical because a cylindrical shape is easy to make. Stainless steel and copper are used as the material of the pipe.

According to the present invention, the amount of molybdenum hexafluoride contaminating tungsten hexafluoride before and after purification is measured by an ICP MS (Inductively Coupled Plasma Mass Spectrometer). The amount of molybdenum can be measured up to 0.04 ppm (detection limit.)

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
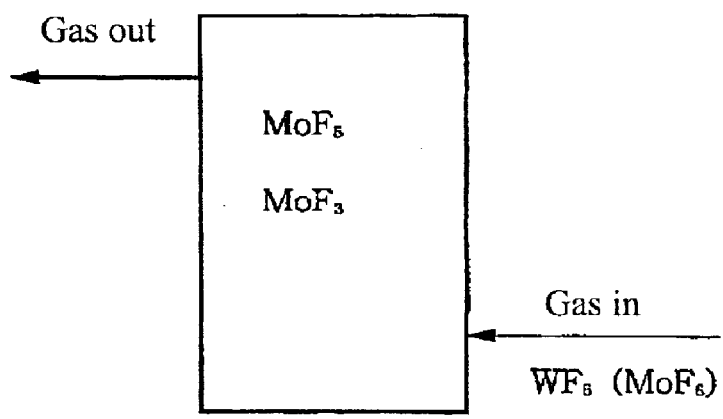
FIG. 1 is a conceptual view showing a method for introducing the material to be purified to the packed tower.
Figure 1:
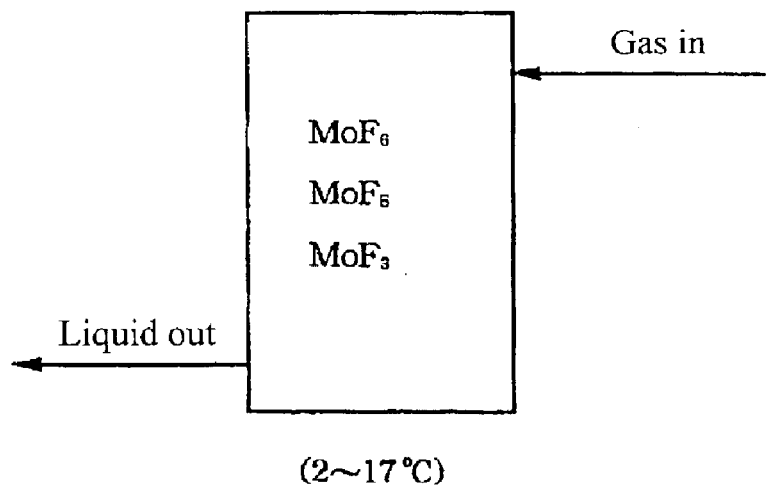
Figure 2:
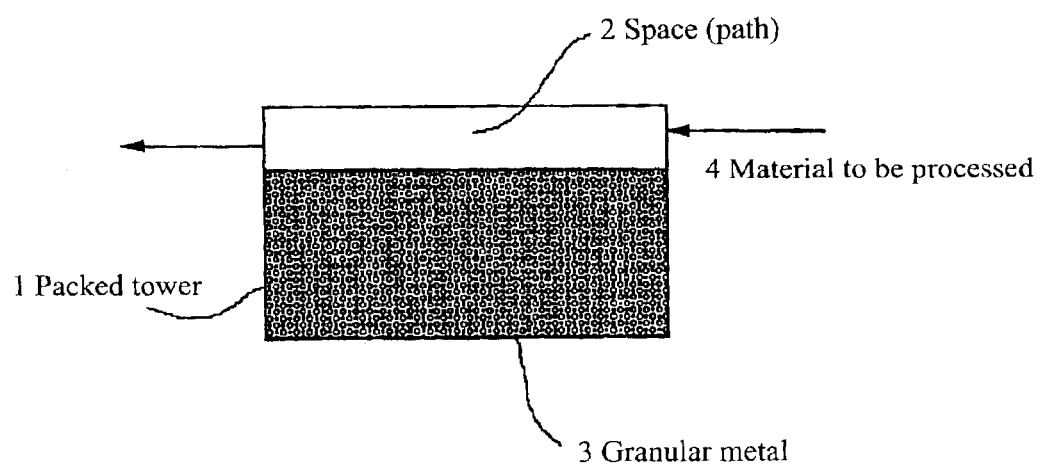
FIG. 2 is a conceptual view showing a method for packing a metal in the packed tower and a method for introducing the material to be purified to the packed tower.

The following is a specific description of the embodiments of the present invention.

EMBODIMENT 1–14

COMPARATIVE EXAMPLE 1–2

In a purifying step of the present invention, the source gas to be purified is passed through a metal packed tower so as to make contact and molybdenum impurities are collected. Next, purified gas is collected by a collector to yield purified tungsten hexafluoride.

The metal-made packed tower used is made of stainless steel (SUS 316L) and has an internal diameter of 50 mm and is 1000 mm long.

1700 cc of metal is packed in the packed tower.

Metals used in the testing and embodiments were (1) molybdenum, (2) tungsten, (3) copper, (4) nickel, (5) iron, (6) cobalt, (7) zinc, (8) titanium, (9) aluminium, (10) calcium, and (11) magnesium.

These metals are prepared for packing in the packed tower as power with a particle size of 1 $\mu$m.

The source gas to be purified is supplied at a rate of 1 L/min.

The collector used for a purified product is cylindrical, is made of stainless steel and has an inner diameter of 75 mm and a length of 500 mm (SUS304).

The temperature of the collector is kept in a range from 0° C. to 10° C.

Tungsten hexafluoride is purified under the conditions shown in Table 1.

The results are shown in Table 1.

It can be seen that purification according to the method of the present invention provides very preferable removal of molybdenum hexafluoride contaminating tungsten hexafluoride.

After the collector is heated to 20° C. and tungsten hexafluoride is vaporized to be discarded from the collector, molybdenum impurities are not collected by the collector, but are collected completely by the metal packed tower.

EMBODIMENT 15–26

In a purifying step of the present invention, a source gas to be purified is passed through a metal packed tower so as to make contact with the metal and molybdenum impurities are collected. Next, the collector collects purified gas to yield purified tungsten hexafluoride.

The metal packed tower used is made of stainless steel (SUS 316L) with an inner diameter of 50 mm and a length of 1000 mm and the packed amount was 1700 cc.

Metals used in the testing and embodiments were (1) molybdenum, (2) tungsten, and (3) aluminum.

These metals are prepared as grains of powder or grains of a particle size of 0.1 $\mu$m to 1 mm.

The temperature for purification is 50° C.

The source gas to be purified is supplied at a rate of 1 L/min.

The collector used for the purified product is cylindrical, and made of stainless steel with an inner diameter of 75 mm and a length of 500 mm (SUS304).

The temperature of the collector is kept in a range from 0° C. to 10° C.

Tungsten hexafluoride is purified under the conditions shown in Table 2.

The results are shown in Table 2 and it can be seen that purification according to the method of the present invention provides very preferable removal of molybdenum hexafluoride contaminating tungsten hexafluoride.

After the collector is heated to 20° C. and tungsten hexafluoride is vaporized so as to be discarded from the collector, molybdenum impurities are not collected by the collector, but rather collected completely by the metal packed tower.

EMBODIMENTS 27–36

In the purifying step of the present invention, the material to be purified is passed in a liquid state through a metal packed tower so as to make contact with the metal and molybdenum impurities are collected. Next, the collector collects purified gas to yield purified tungsten hexafluoride.

The metal packed tower used is made of stainless steel (SUS 316L) and has an inner diameter of 50 mm and is 1000 mm long, and the packed amount is 1700 cc.

Metals used in the testing and embodiments are (1) hastelloy, (2) monel, (3) stainless steel, (4) molybdenum, and (5) tungsten.

These metals are prepared as powder 10 $\mu$m in size and 1 mm particle grains.

The temperature for purification is 50° C.

The source gas for purification is supplied at a rate of 1 L/min.

The collector used for a purified product is cylindrical, made of stainless steel, and has an inner diameter of 75 mm and a length of 500 mm (SUS304).

The temperature of the collector is kept to a range from 0° C. to 10° C.

Tungsten hexafluoride is purified under the conditions shown in Table 3.

The results are shown in Table 3 and it can be seen that purification according to the method of the present invention provides very preferable removal of molybdenum hexafluoride contaminating tungsten hexafluoride.

After the collector heated to 20° C. and tungsten hexafluoride was vaporized to be discarded from the collector, molybdenum impurities are not collected by the collector, but are collected in their entirety by the metal packed tower.

INDUSTRIAL APPLICABILITY

According to the present invention, tungsten hexafluoride of high purity can be obtained readily, effectively, and economically.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

TABLE 1

| | | | Mo Concentration in $WF_6$ | |
|---|---|---|---|---|
| Purification Condition | | | Pretreatment | Post-treatment |
| | Temp. (° C.) | Metal Used | (ppm) | (ppm) |
| Embodiment 1 | 20 | Molybdenum | 300 | <0.04 |
| Embodiment 2 | 100 | Molybdenum | 2000 | <0.04 |
| Embodiment 3 | 20 | Tungsten | 3500 | <0.04 |
| Embodiment 4 | 50 | Tungsten | 3500 | <0.04 |
| Embodiment 5 | 80 | Tungsten | 3500 | <0.04 |
| Embodiment 6 | 50 | Tungsten | 3500 | <0.04 |
| Embodiment 7 | 50 | Nickel | 3500 | <0.04 |
| Embodiment 8 | 50 | Iron | 3500 | <0.04 |
| Embodiment 9 | 50 | Cobalt | 3500 | <0.04 |
| Embodiment 10 | 50 | Zinc | 3500 | <0.04 |
| Embodiment 11 | 50 | Titanium | 3500 | <0.04 |
| Embodiment 12 | 50 | Aluminum | 3500 | <0.04 |
| Embodiment 13 | 50 | Calcium | 3500 | <0.04 |

TABLE 1-continued

| | Purification Condition | | Mo Concentration in $WF_6$ | |
|---|---|---|---|---|
| | Temp. (° C.) | Metal Used | Pretreatment (ppm) | Post-treatment (ppm) |
| Embodiment 14 | 50 | Magnesium | 3500 | <0.04 |
| Comparative Example 1 | 300 | Tungsten | 2200 | 10 |
| Comparative Example 2 | 150 | Molybdenum | 300 | 100 |

TABLE 2

| | Purification Condition | | No Concentration In $WF_6$ | |
|---|---|---|---|---|
| | Particle Size | Metal Used | Pretreatment (ppm) | Post-treatment (ppm) |
| Embodiment 15 | 0.1 μm | Molybdenum | 300 | <0.04 |
| Embodiment 16 | 0.5 μm | Molybdenum | 300 | <0.04 |
| Embodiment 17 | 1 μm | Tungsten | 3500 | <0.04 |
| Embodiment 18 | 0.5 μm | Tungsten | 3500 | <0.04 |
| Embodiment 19 | 1 μm | Tungsten | 3500 | <0.04 |
| Embodiment 20 | 2 μm | Tungsten | 3500 | <0.04 |
| Embodiment 21 | 5 μm | Tungsten | 3500 | <0.04 |
| Embodiment 22 | 15 μm | Tungsten | 3500 | <0.04 |
| Embodiment 23 | 1 mm | Tungsten | 3500 | <0.04 |
| Embodiment 24 | 2 μm | Aluminum | 3500 | <0.04 |
| Embodiment 25 | 15 μm | Aluminum | 3500 | <0.04 |
| Embodiment 26 | 1 mm | Aluminum | 3500 | <0.04 |
| Comparative Example 3 | 2 mm | Tungsten | 2000 | 10 |
| Comparative Example 4 | 3 mm | Molybdenum | 300 | 30 |

TABLE 3

| | Purification Condition | | Mo Concentration in $WF_6$ | |
|---|---|---|---|---|
| | Particle Size | Metal Used | Pretreatment (ppm) | Post-treatment (ppm) |
| Embodiment 27 | 10 μm | Hastelloy | 300 | <0.04 |
| Embodiment 28 | 1 mm | Hastelloy | 300 | <0.04 |
| Embodiment 29 | 10 μm | Monel | 3500 | <0.04 |
| Embodiment 30 | 1 mm | Monel | 3500 | <0.04 |
| Embodiment 31 | 10 μm | Stainless Steel | 3500 | <0.04 |
| Embodiment 32 | 1 mm | Stainless Steel | 3500 | <0.04 |
| Embodiment 33 | 10 μm | Tungsten | 3500 | <0.04 |
| Embodiment 34 | 1 mm | Tungsten | 3500 | <0.04 |
| Embodiment 35 | 10 μm | Molybdenum | 3500 | <0.04 |
| Embodiment 36 | 1 mm | Molybdenum | 3500 | <0.04 |

What is claimed is:

1. A method for purifying tungsten hexafluoride of high purity comprising:

providing tungsten hexafluoride containing at least molybdenum hexafluoride as an impurity; and contacting the tungsten hexafluoride to a metal or an alloy containing at least one of molybdenum, tungsten, copper, nickel, iron, cobalt, zinc, titanium, aluminum, calcium, and magnesium at a temperature ranging from at least 0° C. to less than 100° C., so as to thereby result in a molybdenum concentration of less than 0.04 ppm in the tungsten hexafluoride.

2. The method for purifying tungsten hexafluoride of high purity according to claim 1, in which the tungsten hexafluoride makes contact with a powdered and/or granular metal or alloy.

3. The method for purifying tungsten hexafluoride of high purity according to claim 2, in which a particle size of said powdered and/or granular metal or alloy is 1 mm or smaller.

4. The method for purifying tungsten hexafluoride of high purity according to claim 1, in which the tungsten hexafluoride makes contact with a metal or an alloy, the tungsten hexafluoride being a mixture of a gas and a liquid.

5. The method for purifying tungsten hexafluoride of high purity according to claim 2, in which said powdered and/or granular metal or alloy is packed in a packed tower to create a lateral space and the space is used as a path for the tungsten hexafluoride.

6. The method for purifying tungsten hexafluoride of high purity according to claim 2, in which the tungsten hexafluoride makes contact with a metal or an alloy, the tungsten hexafluoride being a mixture of a gas and a liquid.

7. The method for purifying tungsten hexafluoride of high purity according to claim 3, in which the tungsten hexafluoride makes contact with a metal or an alloy, the tungsten hexafluoride being a mixture of a gas and a liquid.

8. The method for purifying tungsten hexafluoride of high purity according to claim 2, in which said powdered and/or granular metal or alloy is packed in a packed tower to create a lateral space and the space is used as a path for the tungsten hexafluoride.

9. The method for purifying tungsten hexafluoride of high purity according to claim 3, in which said powdered and/or granular metal or alloy is packed in a packed tower to create a lateral space and the space is used as a path for the tungsten hexafluoride.

10. The method for purifying tungsten hexafluoride of high purity according to claim 4, in which a powdered and/or granular metal or alloy is packed in a packed tower to create a lateral space and the space is used as a path for the tungsten hexafluoride.

* * * * *